United States Patent
Park et al.

(10) Patent No.: US 9,568,813 B2
(45) Date of Patent: Feb. 14, 2017

(54) PROJECTOR WITH REDUCED GHOST IMAGE OCCURRENCE

(71) Applicant: SAMSUNG ELECTRONICS CO., LTD., Suwon-si, Gyeonggi-do (KR)

(72) Inventors: Seong-ha Park, Suwon-si (KR); Dong-hi Lee, Suwon-si (KR); Yong-kwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 14/485,992

(22) Filed: Sep. 15, 2014

(65) Prior Publication Data

US 2015/0286118 A1 Oct. 8, 2015

(30) Foreign Application Priority Data

Apr. 2, 2014 (KR) .................. 10-2014-0039357

(51) Int. Cl.
| | |
|---|---|
| *G03B 21/14* | (2006.01) |
| *G03B 21/20* | (2006.01) |
| *G03B 21/18* | (2006.01) |
| *G03B 21/26* | (2006.01) |
| *G03B 21/00* | (2006.01) |

(52) U.S. Cl.
CPC ........... *G03B 21/147* (2013.01); *G03B 21/008* (2013.01); *G03B 21/18* (2013.01); *G03B 21/208* (2013.01); *G03B 21/2066* (2013.01); *G03B 21/26* (2013.01)

(58) Field of Classification Search
CPC ....... G03B 21/18; G03B 21/26; G03B 21/147; G03B 21/2053; G03B 21/208
USPC ............. 353/102, 31, 34, 37; 349/5, 7, 8, 9; 348/742, 743, 771
See application file for complete search history.

(56) References Cited

U.S. PATENT DOCUMENTS

| | | | |
|---|---|---|---|
| 6,113,240 A * | 9/2000 | Iizuka .................. | G03B 3/00 348/744 |
| 6,439,726 B1 | 8/2002 | Piehler | |
| 6,784,946 B1 * | 8/2004 | Schroter .............. | H04N 9/3114 348/771 |
| 6,894,845 B2 | 5/2005 | Narimatsu et al. | |
| 7,052,139 B2 | 5/2006 | Akiyama | |

(Continued)

FOREIGN PATENT DOCUMENTS

| | | |
|---|---|---|
| KR | 10-2002-0044166 A | 6/2002 |
| KR | 10-0800936 B1 | 1/2008 |
| KR | 10-2012-0000404 A | 1/2012 |

*Primary Examiner* — William C Dowling
(74) *Attorney, Agent, or Firm* — Drinker Biddle & Reath LLP

(57) ABSTRACT

A projector includes a light source that emits a light beam, an illumination lens unit, a display device, a projection lens unit, a field lens, and a reflection member. The illumination lens unit shapes and focuses the light beam into an illumination light beam. The display device modulates the illumination light beam and forms an image. The projection lens unit projects the image on a screen. The field lens has a positive refractive power for focusing the illumination light beam on the display device, a first lens surface on which the illumination light beam is incident, and a second lens surface on which the image formed by the display device is incident. The reflection member changes an illumination light beam path into a direction of the field lens. The first lens surface reflects a portion of the illumination light beam into a path that avoids the projection lens unit.

14 Claims, 4 Drawing Sheets

(56) References Cited

U.S. PATENT DOCUMENTS

| | | | |
|---|---|---|---|
| 7,159,989 B2 * | 1/2007 | Yano | G02B 17/02 |
| | | | 348/771 |
| 7,350,928 B2 | 4/2008 | Liao et al. | |
| 7,859,763 B2 | 12/2010 | Lu et al. | |
| 8,217,332 B2 | 7/2012 | Chen et al. | |
| 8,292,440 B2 | 10/2012 | Chang et al. | |
| 8,363,327 B2 | 1/2013 | Lu et al. | |
| 8,422,140 B2 | 4/2013 | Wang et al. | |
| 8,649,101 B2 * | 2/2014 | Kang | G02B 13/16 |
| | | | 359/649 |
| 2002/0057418 A1 * | 5/2002 | Wang | G03B 21/26 |
| | | | 353/53 |
| 2003/0107715 A1 * | 6/2003 | Wang | G03B 21/28 |
| | | | 353/98 |
| 2011/0090463 A1 | 4/2011 | Jhang et al. | |
| 2011/0090464 A1 * | 4/2011 | Jhang | G03B 21/28 |
| | | | 353/31 |
| 2011/0119581 A1 | 5/2011 | Bhogal et al. | |
| 2011/0199581 A1 * | 8/2011 | Jhang | H04N 9/3152 |
| | | | 353/31 |
| 2013/0188156 A1 | 7/2013 | Kim et al. | |
| 2014/0098349 A1 * | 4/2014 | Nagasawa | G03B 21/2033 |
| | | | 353/31 |

\* cited by examiner

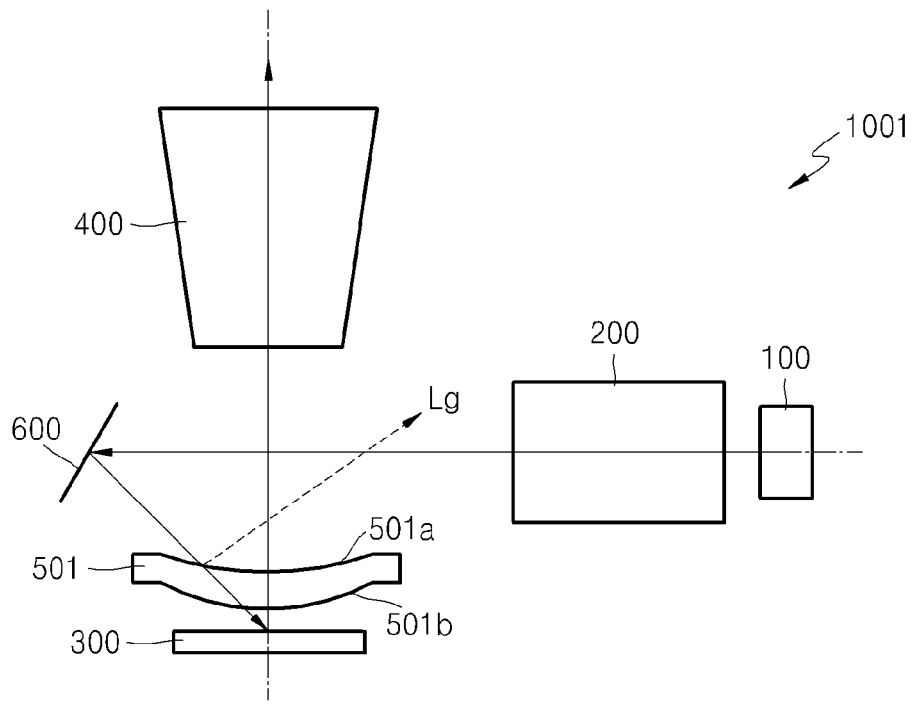
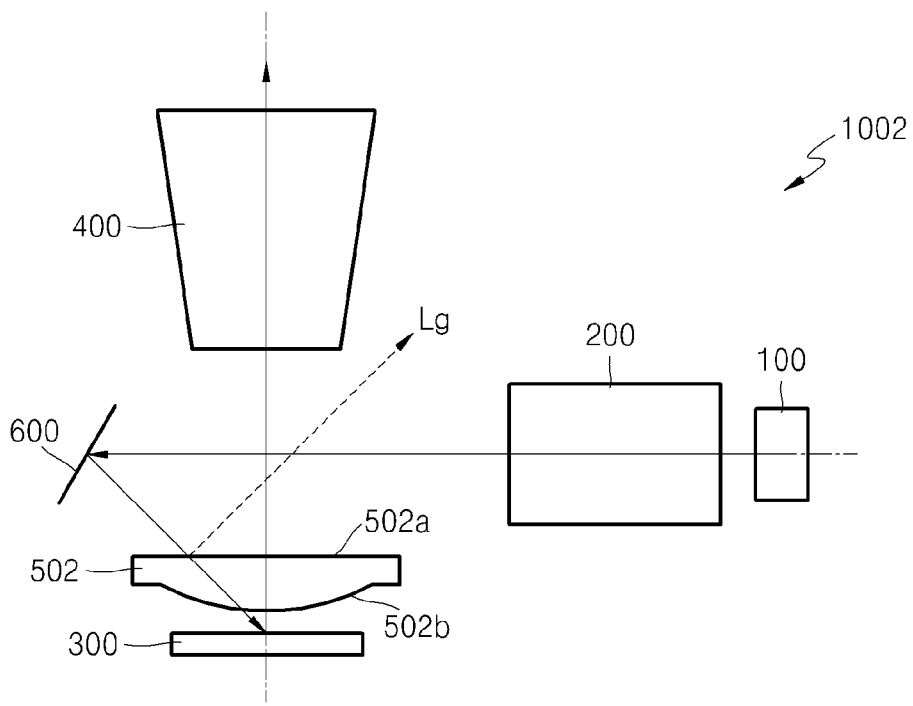

PROJECTOR WITH REDUCED GHOST IMAGE OCCURRENCE

CROSS REFERENCE TO RELATED PATENT APPLICATIONS

This application claims the priority benefit of Korean Patent Application No. 10-2014-0039357, filed on Apr. 2, 2014, in the Korean Intellectual Property Office, the disclosure of which is incorporated by reference herein in its entirety.

BACKGROUND

1. Field

One or more embodiments of the present disclosure relate to a small-sized projector for projecting an image on a screen.

2. Related Art

Recently, technology developments related to a small-sized projector which projects externally and displays data or moving pictures stored in a display apparatus, such as a mobile phone, a computer, an MP3 player, and a small-sized digital camera, as images, have been rapidly made. Generally, a small-sized projector has a small-sized flat-panel-type display device such as a digital micro-mirror device (DMD) or a liquid crystal display (LCD).

Also, a projector generally has an illumination optical system and a projection optical system.

The illumination optical system denotes an optical system arranged in an optical path from a light source to a display device, and the projection optical system denotes an optical system arranged in an optical path from the display device to an external screen.

In order to install a projector in a small-sized display apparatus, the required size of a projector has been gradually decreasing. However, if the projector is made small enough to be installed in a small-sized display apparatus, optical devices of the illumination optical system and the projection optical system may interfere with each other. For example, when an optical device forming an illumination optical system is placed in an optical path of a projection optical system, light reflected from the optical device may be incident on the projection optical system to form a ghost image. To prevent this, a method for multilayer thin-film evaporation to prevent reflection on the surface of the optical device is used. However, this method reduces production speed of the optical device and may degrade contrast ratio or color gamut and thus degrade the quality of images.

SUMMARY

One or more embodiments of the present disclosure include a projector with an improved quality of an image projected on a screen.

Additional embodiments will be set forth in part in the description which follows and, in part, will be apparent from the description, or may be learned by practice of the presented embodiments.

According to one or more embodiments, a projector includes: a light source that emits a light beam; an illumination lens unit that includes one or more lenses that shape and focus the light beam emitted from the light source to form an illumination light beam for forming an image; a display device that modulates the incident illumination light beam based on a driving signal and thus forms the image; a projection lens unit that includes one or more lenses that project the image formed by the display device on a screen; a field lens having a positive refractive power for focusing the illumination light beam on the display device, the field lens having a first lens surface on which the illumination light beam is incident and a second lens surface on which the image formed by the display device is incident; and a reflection member that changes a path of the illumination light beam having passed through the illumination lens unit into a direction of the field lens. The first lens surface has a shape that reflects a portion of the illumination light beam into a path that avoids the projection lens unit when the portion of the illumination light beam is reflected.

The field lens may have a meniscus shape that is convex toward the display device.

The field lens may be a plano-convex lens of which the first lens surface is flat and the second lens surface is convex.

The field lens may be a biconvex lens and an absolute value of a radius of curvature of the first lens surface is greater than a radius of curvature of the second lens surface.

The field lens may satisfy the following condition:

$$|R1| \geq 10 * |R2|$$

wherein R1 is the radius of curvature of the first lens surface and R2 is the radius of curvature of the second lens surface.

The field lens may satisfy the following condition:

$$|R1| \geq 200 \text{ mm}$$

wherein R1 is the radius of curvature of the first lens surface.

At least one surface of the field lens may be a spherical surface.

An anti-reflection coating may be provided on the first lens surface of the field lens.

An optical axis of the projection lens unit and a central axis of the display device may be in parallel and spaced by a predetermined distance.

One or more lenses included in the projection lens unit may move along an optical axis to focus the illumination light beam with respect to a position of the screen.

The illumination lens unit may include: a collimating lens that collimates the light beam from the light source into a substantially parallel light beam; a fly eye lens that substantially equalizes a color and brightness of the illumination light beam; and a relay lens that focuses the illumination light beam onto the display device.

The light source may include a first light source and a second light source, and colors of light beams emitted from the first and second light sources may be different from each other.

The first and second light sources may be arranged to emit light beams along their respective optical axes that intersect with each other. The projector may further include a filter that controls optical paths of the light beams from the first and second light sources so as to make the light beams from the first and second light sources travel along an identical optical axis.

The projection lens unit may include four lenses having negative, positive, negative and positive refractive powers, respectively, arranged in this order from the screen.

The projection lens unit may include three lenses having positive, negative and positive refractive powers, respectively, arranged in this order from the screen.

BRIEF DESCRIPTION OF THE DRAWINGS

These and/or other embodiments will become apparent and more readily appreciated from the following description of various embodiments, taken in conjunction with the accompanying drawings in which:

FIGS. 2A through 2D illustrate optical paths of reflected light based on various shapes of a lens surface of a field lens employed in a projector according to an embodiment;

DETAILED DESCRIPTION

Figure 1:
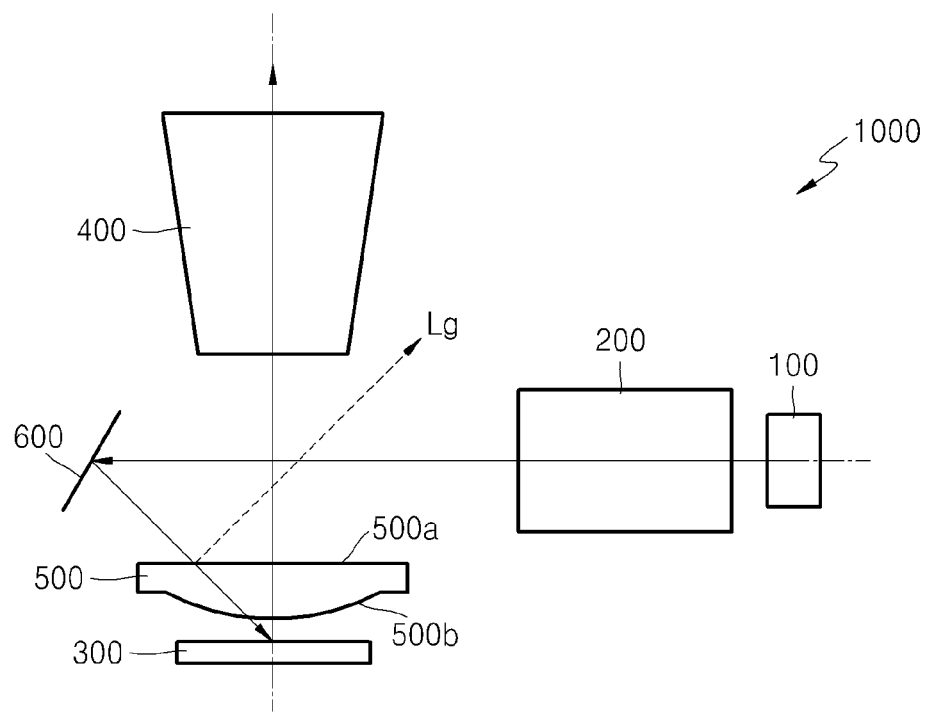
FIG. 1 is a schematic diagram a structure of a projector according to an embodiment.

Reference will now be made in detail to various embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 is a schematic diagram of a structure of a projector 1000 according to an embodiment.

Referring to FIG. 1, the projector 1000 includes a light source 100, an illumination lens unit 200 which includes one or more lenses for shaping and focusing a light beam emitted from the light source 100 and thus forming illumination light to form an image, a display device 300 which modulates the incident illumination light according to a driving signal and thus forms an image, a projection lens unit 400 which includes one or more lenses for projecting on a screen the image formed by the display device 300, a field lens 500 which has a positive refractive power and focuses the illumination light on the display device 300, and a reflection member 600 which changes the path of the illumination light having passed through the illumination lens unit 200 into the direction of the field lens 500.

The light source 100, the illumination lens unit 200, the reflection member 600 and the field lens 500 form an illumination optical system for providing the display device 300 with light for forming an image. The field lens 500 and the projection lens unit 400 form a projection optical system for projecting an image formed by the display device 300 on a screen (not shown).

The projector 1000 according to the present embodiment may improve the quality of a picture by adjusting the shape of a lens surface of the field lens 500 which is shared by the illumination optical system and the projection optical system.

In the field lens 500, the shape of the lens surface is designed such that when a part of incident illumination light is reflected, the part of incident illumination light is reflected into a path avoiding the projection lens unit 400. The field lens 500 includes a first lens surface 500a on which illumination light is incident, and a second lens surface 500b on which an image formed by the display device 300 is incident. Here, when light Lg reflected on the first lens surface 500a is incident on the projection lens unit 400, it may cause degradation of the quality of a picture in the form of a ghost image. Accordingly, in the present embodiment, the shape of the first lens surface 500a is designed such that the light Lg reflected on the first lens surface 500a is not incident on the projection lens unit 400.

FIGS. 2A, 2B, 2C, and 2D illustrate optical paths of reflected light Lg according to the shapes of lens surfaces 501a, 502a, 503a, and 504a of field lenses 501, 502, 503, and 504, respectively, employed in projectors 1001, 1002, 1003, and 1004 (e.g., instances of the projector 1000) according to various embodiments.

In FIG. 2A, the shape of the field lens 501 is a meniscus which is convex toward the display device 300. That is, the first lens surface 501a has a concave shape, and in this case, the reflected light Lg of light which is incident on the first lens surface 501a via a reflection member 600 has a path in the direction in which the light Lg is not incident on the projection lens unit 400.

In FIG. 2B, the shape of the field lens 502 is a plano-concave shape, that is, the first lens surface 502a is flat and the second lens surface 502b is convex. Also in this case, the reflected light Lg of light which is incident on the first lens surface 502a via a reflection member 600 has a path in the direction in which the light Lg is not incident on the projection lens unit 400.

Figure 2C:
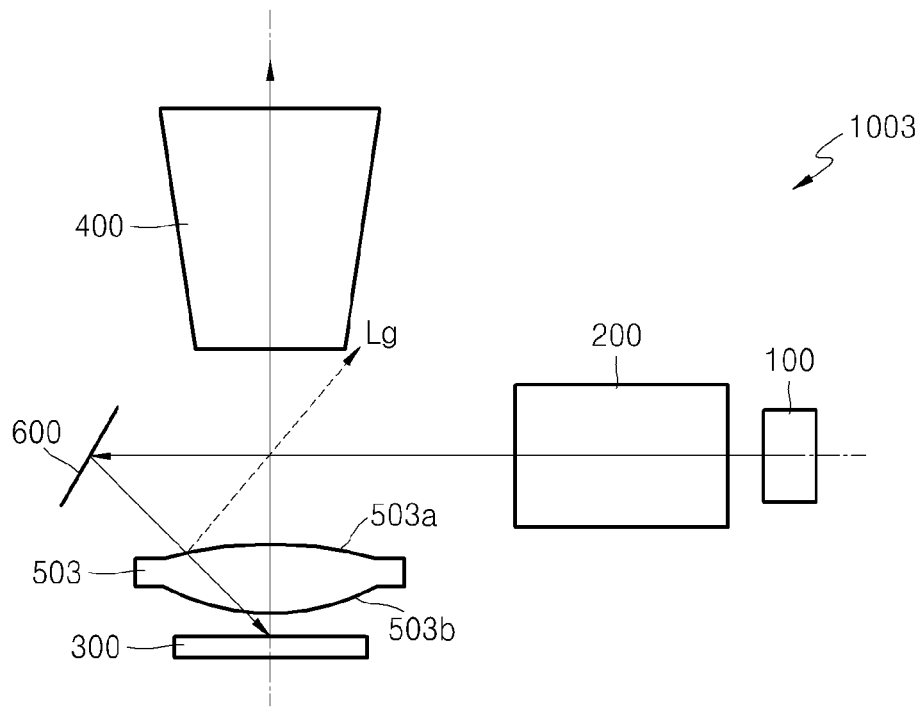
Figure 2D:
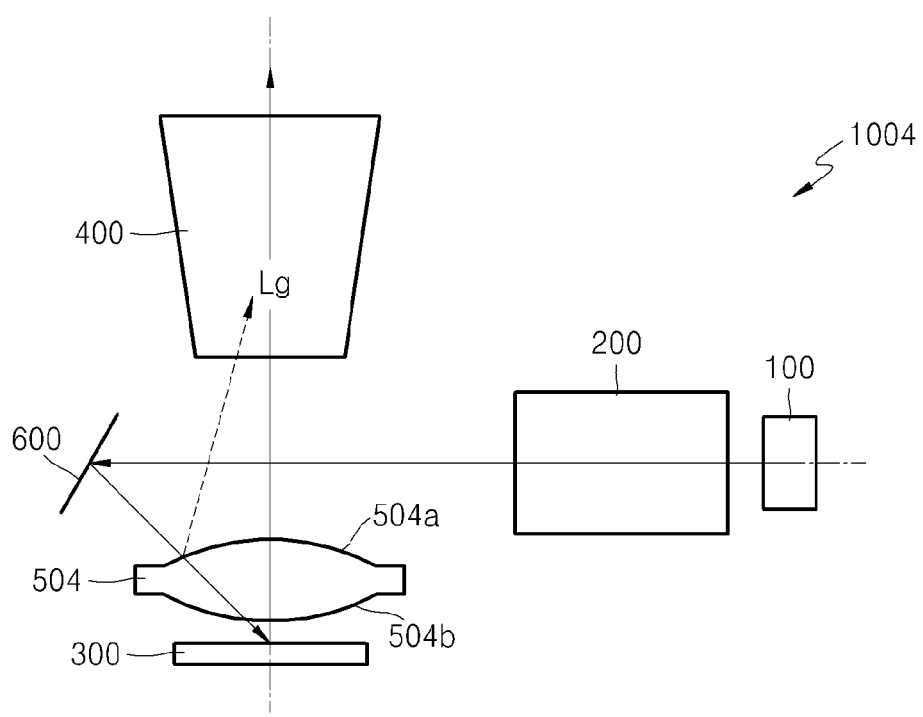

In FIGS. 2C and 2D, the shapes of the field lens 503 and 504 are biconvex shapes. Also in the case where the shape of the first lens surface 503a or 504a of the field lenses 503 or 504 is convex, the reflected light Lg from the first lens surface 503a or 504a may be made to have a path in which the light Lg is not incident on the projection lens unit 400, by appropriately adjusting a curvature of the first lens surface 503a or 504a. For example, in the case of FIG. 2C, the absolute value of the radius of curvature of the first lens surface 503a is formed to be greater than the absolute value of the radius of curvature of the second lens surface 503b, and the reflected light Lg from the first lens surface 503a is not incident on the projection lens unit 400. On the other hand, as in FIG. 2D, when the absolute value of the radius of curvature of the first lens surface 504a is similar to the absolute value of the radius of curvature of the second lens surface 504b, the reflected light Lg from the first lens surface 504a may be incident on the projection lens unit 400.

Thus, the field lens 500 may have a meniscus shape (as in field lens 501) or plano-convex shape (as in field lens 502) that is convex toward the display device 300, or may have a biconvex shape (as in field lens 503) in which the absolute value of the radius of curvature of the first lens surface (503a) is greater than the absolute value of the radius of curvature of the second lens surface (503b). When the field lens 500 has a biconvex shape (as in field lens 503), the absolute value of the radius of curvature of the first lens surface (503a) may be formed to be approximately 2.5 times greater than the absolute value of the radius of curvature of the second lens surface (503b), and preferably 10 or more times greater, or the absolute value of the radius of curvature of the first lens surface (503a) may be formed to be equal to or greater than 50 mm, and preferably to be 200 mm.

More detailed shape conditions for providing that the reflected light Lg from the first lens surface 500a is not incident on the projection lens unit 400 relate to the distance from the field lens 500 to the projection lens unit 400, the effective diameter of the projection lens unit 400, and the location of the reflection member 600, and based on these factors, the shape of the first lens surface 500a may be determined.

The following table shows the result of a computer simulation on whether or not a ghost image occurs according to the shapes of the field lens 500, that is, by changing a radius R1 of curvature of the first lens surface 500a with a fixed radius R2 of curvature of the second lens surface 500b:

TABLE

| Field lens shape/radius of curvature | R1(mm) | R2(mm) | ghost image |
|---|---|---|---|
| Meniscus (concave-convex) | −50 | −19.5 | X |
| Meniscus (concave-convex) | −150 | −19.5 | X |
| plano-convex | ∞ | −19.5 | X |
| Biconvex | 500 | −19.5 | X |
| Biconvex | 400 | −19.5 | Δ |
| Biconvex | 200 | −19.5 | Δ |
| Biconvex | 50 | −19.5 | ○ |

Referring to the table, when the field lens 500 has a meniscus shape and a plano-convex shape that is convex toward the display device 300, a ghost image does not appear, as indicated by 'X'. When the field lens 500 has a biconvex shape, the degree of occurrences of a ghost image varies with respect to the radius R1 of curvature of the first lens surface 500a. In detail, when R1 decreases, a ghost image becomes more apparent.

When the value of R1 is 500 mm, a ghost image does not appear, and when 400 mm and 200 mm, a ghost image, which is difficult to recognize by the naked eyes, appears, which are indicated by 'Δ'. When R1 is 50 mm, a ghost image, which is clearly recognizable with the naked eyes, appears, as indicated by 'O'.

Referring to the computer simulation results, it can be understood that the shape of the field lens 500 may be made to be a meniscus or plano-convex shape and thus reduce a ghost image occurrence. Also, when the shape of the field lens 500 is made to be a biconvex shape, the radius R1 of curvature of the first lens surface 500a corresponding to the object side of the field lens 500 may be made to be bigger, for example, to be equal to or greater than approximately 200 mm, and thus reduce a ghost image occurrence.

Various experiments have confirmed that when the shape of the first lens surface 500a of the field lens 500 is made to be flat, a ghost image occurrence by reflected light on the first lens surface 500a is substantially reduced. When a biconvex lens (e.g., field lens 504) with both surfaces having similar absolute values of the radius of curvature is employed as the field lens 500, a ghost image appears. However, when the shape of the first lens surface 500a of the field lens 500 is made to be flat, a ghost image does not appear.

Figure 3:
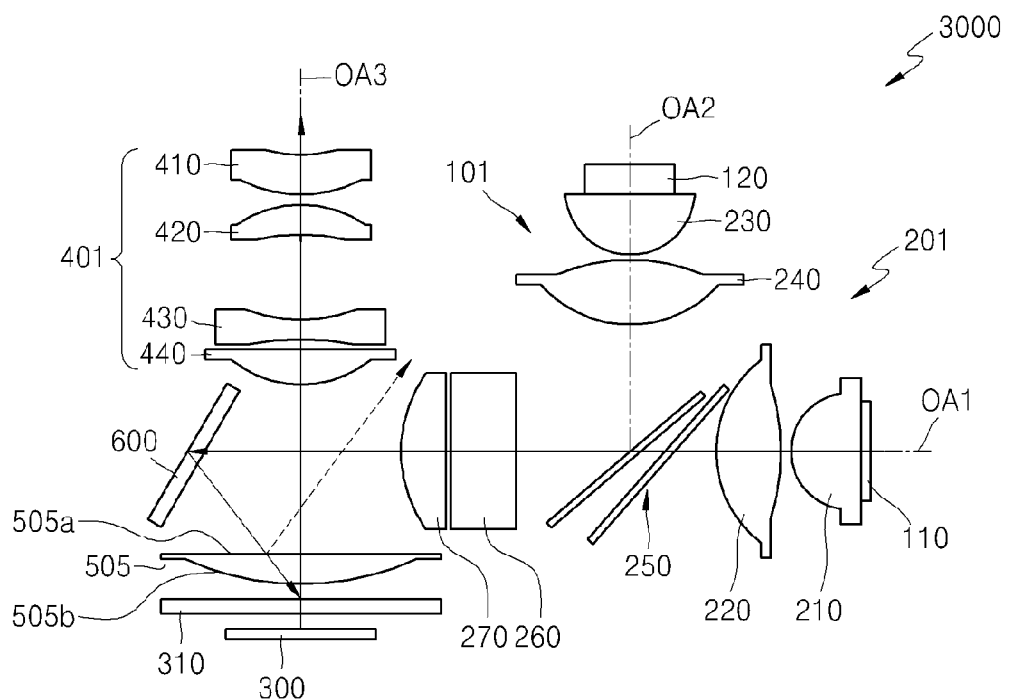
FIG. 3 shows a detailed structure of a projector according to an embodiment.

FIG. 3 shows a detailed structure of a projector 3000 according to an embodiment.

In the projector 3000 according to the present embodiment, a light source 101, an illumination lens unit 201, a reflection member 600, and a field lens 505 provide an illumination optical system of the projector 3000, and the field lens 505 and a projection lens unit 401 provide a projection optical system of the projector 3000.

The light source 101 includes a first light source 110 and a second light source 120 for emitting light beams. The illumination lens unit 201 includes first, second, third, and fourth collimating lenses 210, 220, 230, and 240, a filter 250, a fly-eye lens 260, and a relay lens 270.

The first light source 110, the first and second collimating lenses 210 and 220, the filter 250, the fly-eye lens 260, and the relay lens 270 are arranged on a first optical axis OA1, and the second light source 120 and the third and fourth collimating lenses 230 and 240 are arranged on a second optical axis OA2. The filter 250 is provided on a location where the first optical axis OA1 and the second optical axis OA2 intersect and combines the optical path traveling along the second optical axis OA2 into the first optical axis OA1.

An optical axis of an optical system denotes an axis with respect to which the optical system has rotational symmetry. Arrangement on an optical axis means that the curvature center of an optical device constructing a corresponding optical system is on the optical axis or a symmetrical point or central point of the optical device is on the optical axis.

Though the first and second optical axes OA1 and OA2 are shown to intersect at a right angle, in other embodiments they may have different arrangements or alignments.

The first light source 110 outputs a first monochromatic light beam traveling along the first optical axis OA1. For example, as the first light source 110, a light emitting diode (LED) outputting a green light beam may be employed.

The first light source 110 may output the first monochromatic light beam emitting (e.g., diverging) with a predetermined angle centered on the first optical axis OA1, and the output light beam may be collimated by the first and second collimating lenses 210 and 220. Collimating means reducing a divergence angle of a light beam, and thus generally making light rays of the light beam travel in parallel without converging or diverging. Each of the first and second collimating lenses 210 and 220 may employ an aspherical surface on at least one surface. Though the first and second collimating lenses 210 and 220 are shown, this is just an example and the number of collimating lenses may vary in other embodiments.

The second light source 120 outputs second and third monochromatic light beams travelling along the second optical axis OA2. For example, as the second light source 120, one or more LEDs or other lights outputting a red light beam and a blue light beam may be employed.

The third and fourth collimating lenses 230 and 240 collimate the second and third monochromatic light beams output and emitted from the second light source 120, into substantially parallel light beams. Although a single light source 120 is shown in the drawing, in other embodiments, light sources outputting the second and third monochromatic light beams may be provided separately, and in this case, a collimating lens for each light source may be provided in front of the light source.

The filter 250 combines the paths of the first, second, and third monochromatic light beams traveling along the first and second optical axes OA1 and OA2 such that the light beams travel along the first optical axis OA1. For example, the incident first monochromatic light beam having passed through the first and second collimating lenses 210 and 220 is transmitted through the filter 250, and the incident second and third monochromatic light beams having passed through the third and fourth collimating lenses 230 and 240 are reflected by the filter 250, so that the second and third monochromatic light beams travel along the first optical axis OA1.

As the filter 250, a dichroic filter such as a wavelength selective filter which selectively transmits or reflects light according to the wavelength of the light may be employed.

In other embodiments, a prism may be used or a wavelength-independent filter such as a beam splitter or a half mirror may be used as the filter 250. By the filter 250, the first, second, and third monochromatic light beams are made to travel along the same first optical axis OA1.

In the present embodiment, it is explained that a plurality of light sources are used, in which light beams output from the first and second light sources 110 and 120 are mixed and thus generate white light. However, this is just an example, and in alternative embodiments, one light source outputting light beams with a variety of colors, for example, a wavelength variable light source, may be used, or three light sources with three primary colors may be used, or a white color light source may be used with various color filters.

The fly-eye lens 260 generally equalizes the color and brightness of the input light from the filter 250 and outputs the light equalized light. The fly-eye lens 260 may be formed with a plurality of micro-lenses arranged in a matrix form with a generally rectangular shape on a plane perpendicular to the first optical axis OA1.

The intensity distribution of light incident on the fly-eye lens 260 is generally a Gaussian distribution, that is, the intensity distribution has a shape in which the intensity of a central part thereof is high and that of a periphery thereof is low. The fly-eye lens 260 equalizes the intensity distribution of the incident light having this shape and outputs the equalized light. In some embodiments, the aspect ratio of a light beam output from the fly-eye lens 260 matches an aspect ratio of the display device 300 and thus color uniformity may be enhanced.

Coupled with the fly-eye lens 260, the relay lens 270 limits the length of an optical path and focuses the incident light beam from the fly-eye lens 260 on a surface of the display device 300 by considering overfill of the display device 300.

The reflection member 600 receives the light beam focused by the relay lens 270 and reflects the light beam to the display device 300. The reflection member 600 may have a structure in which a dielectric layer or a metal layer is deposited by evaporation on a transparent substrate.

The field lens 505 focuses the light beam reflected from the reflection member 600 onto the display device 300.

An anti-reflection (AR) coating may be applied on an optical surface of each lens forming the projector 3000 to minimize a corresponding reflection ratio of incident light. This AR coating may be formed to minimize reflection of light incident on a surface and may have a structure in which, for example, a layer with a high refractive ratio, such as an $Nb_2O_5$ layer, and a layer with a low refractive ratio, such as an $SiO_2$ layer, may be laminated alternately.

In particular, light reflected on the screen side surface of the field lens 500, that is, the first lens surface 505a, may cause large noise in an image, and therefore the AR coating layer may also be formed on the first lens surface 505a.

However, even when there is an AR coating layer, perfect reflection prevention is not achieved on the first lens surface 505a, and in the present embodiment, the shape of the first lens surface 505a is designed such that light reflected on the first lens surface 505a is made to be not incident on the projection lens unit 401.

The display device 300 produces an image in units of pixels and has a predetermined number of pixels according to a preset resolution. By selectively turning these pixels on and/or off, an image is displayed. As the display device 300, a digital micro-mirror device (DMD) may be used. A DMD is formed with micro-mirrors arranged in a matrix form, and each micro mirror rotates to a position corresponding to an on state or an off state according to a driving signal. That is, when the micro-mirror is in an on state, it reflects incident light in an angle to display the light on a screen, and when the micro-mirror is in an off state, it reflects incident light in an angle that does not display the light on the screen.

Alternatively, a liquid crystal on silicon (LCoS) device may be used as the display device 300.

Between the display device 300 and the field lens 505, a cover glass 310 for protecting the display device 300 may be provided. Also, the display device 300 may further include a circuit board for providing a driving signal to each of the pixels forming the display device 300.

The field lens 505 and the projection lens unit 401 are arranged along the third optical axis OA3 to form a projection optical system.

The field lens 505 receives a light beam reflected from the display device 300 and outputs the light beam after reducing the beam spot size of the light beam. The projection light beam reflected from the display device 300 has a large beam spot size and thus some of the light beam may not be incident on the projection lens unit 401, which may cause optical loss. The field lens 505 focuses the light beam reflected from the display device 300 and thus reduces the beam spot size so that a maximum amount of light can be incident on the projection lens unit 401.

The projection lens unit 401 receives the light beam of which beam spot size is adjusted from the field lens 505 and focuses the projection light (e.g., the light beam) on the screen. The projection lens unit 401 may include a first lens 410 with a negative refractive power, a second lens 420 with a positive refractive power, a third lens 430 with a negative refractive power and a fourth lens 440 with a positive refractive power in this order from the screen. The first lens 410 may have a meniscus shape that is convex toward the display device 300, and the second lens 420 may have a meniscus shape that is convex toward the screen. The third lens 430 may have a bi-concave shape, and the fourth lens 440 may have a plano-convex shape. On a lens surface of each lens 410, 420, 430, and 440, a spherical surface or an aspherical surface may be employed appropriately.

The projection lens unit 401 may be formed where all or some of the lenses included in the projection lens unit 401 may move along the third optical axis OA3 in order to allow adjustment of a focal length. The projection lens unit 401 may enlarge and display an image formed by the display device 300 on the screen.

The shape of each lens forming the projection lens unit 401 is shown as an example. Also, the number of lenses or arrangement of refractive powers of the projection lens unit 401 may be changed to be different from those shown in FIG. 3, and the projection lens unit 401 may be changed to a structure including three lenses having positive, negative and positive refractive powers, respectively.

Figure 4:
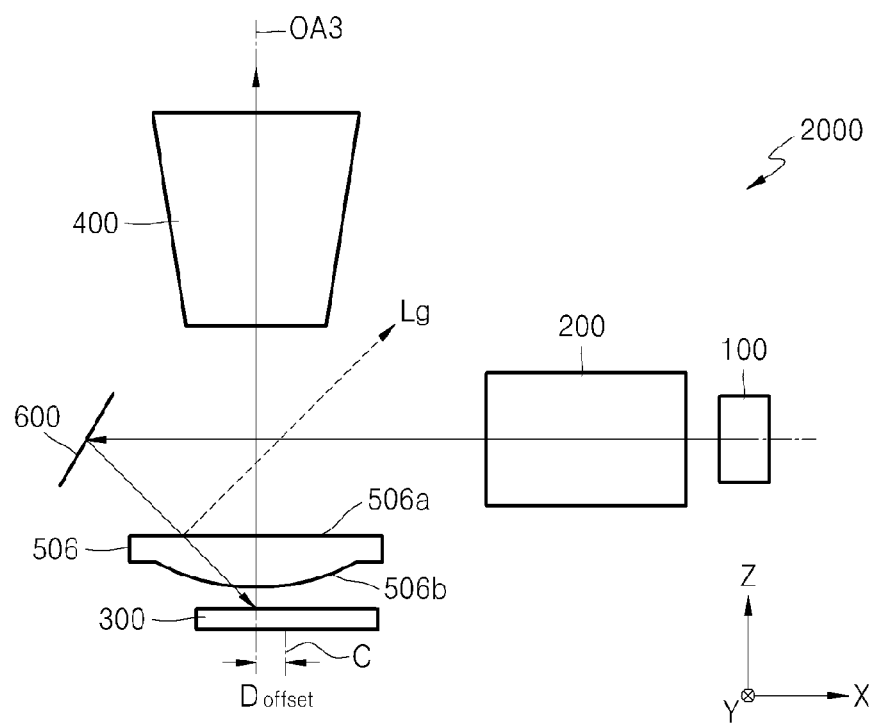
FIG. 4 is a schematic diagram showing a structure of a projector according to an embodiment.

FIG. 4 is a schematic diagram showing a structure of a projector 2000 according to another embodiment.

Compared to the projector 1000 of FIG. 1, the projector 2000 of the present embodiment has the structure including the field lens 506 that has one or more of the features described above and that is additionally offset by a predetermined distance offset $D_{offset}$ between a central axis C of the display device 300 and the optical axis of the projection optical system, that is, the third optical axis OA3.

The display device 300 is formed by a plurality of pixels arranged in the horizontal direction (Y direction) and vertical direction (X direction), and the offset $D_{offset}$ may be expressed in a percentage with respect to a length corresponding to half of the vertical length (X direction) in which pixels forming the display device 300 are arranged.

For example, when the central axis C of the display device 300 and the third optical axis OA3 coincide, the offset $D_{offset}$ is 0%. When the third optical axis OA3 is at the end of the horizontal direction, the offset $D_{offset}$ is 100%. The offset $D_{offset}$ may be provided in an approximately 3%~20% range. The providing of this offset $D_{offset}$ may substantially remove a ghost image that may occur on the screen, to the outside of the screen and thus may improve efficiency. A detailed structure of the projection lens unit 400 when an offset $D_{offset}$ is used may vary from the structure without an offset $D_{offset}$ or with a different offset $D_{offset}$.

The projector described above reduces a ghost image occurrence by forming the shape of a lens surface such that light reflected from the field lens is not incident on the projection lens unit.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A projector comprising:
   a light source that emits a light beam;
   an illumination lens unit that comprises one or more lenses that shape and focus the light beam emitted from the light source to form an illumination light beam for forming an image;
   a display device that modulates the incident illumination light beam based on a driving signal and thus forms the image;
   a projection lens unit that comprises one or more lenses that project the image formed by the display device on a screen;
   a field lens having a positive refractive power for focusing the illumination light beam on the display device, the field lens comprising a first lens surface on which the illumination light beam is incident and a second lens surface on which the image formed by the display device is incident; and
   a reflection member that changes a path of the illumination light beam having passed through the illumination lens unit into a direction of the field lens;
   wherein the first lens surface has a shape that reflects a portion of the illumination light beam into a path that avoids the projection lens unit when the portion of the illumination light beam is reflected; and
   wherein the field lens has a meniscus shape that is convex toward the display device.

2. A projector, comprising:
   a light source that emits a light beams;
   an illumination lens unit that comprises one or more lenses that shape and focus the light beam emitted from the light source to form an illumination light beam for forming an image;
   a display device that modulates the incident illumination light beam based on a driving signal and thus forms the image;
   a projection lens unit that comprises one or more lenses that project the image formed by the display device on a screen;
   a field lens having a positive refractive power for focusing the illumination light beam on the display device, the field lens comprising a first lens surface on which the illumination light beam is incident and a second lens surface on which the image formed by the display device is incident; and
   a reflection member that changes a path of the illumination light beam having passed through the illumination lens unit into a direction of the field lens;
   wherein the first lens surface has a shape that reflects a portion of the illumination light beam into a path that avoids the projection lens unit when the portion of the illumination light beam is reflected; and
   wherein the field lens has a shape that is convex toward the display device; and
   wherein the field lens is a plano-convex lens of which the first lens surface is flat and the second lens surface is convex.

3. A projector, comprising:
   a light source that emits a light beam;
   an illumination lens unit that comprises one or more lenses that shape and focus the light beam emitted from the light source to form an illumination light beam for forming an image;
   a display device that modulates the incident illumination light beam based on a driving signal and thus forms the image;
   a projection lens unit that comprises one or more lenses that project the image formed by the display device on a screen;
   a field lens having a positive refractive power for focusing the illumination light beam on the display device, the field lens comprising a first lens surface on which the illumination light beam is incident and a second lens surface on which the image formed by the display device is incident; and
   a reflection member that changes a path of the illumination light beam having passed through the illumination lens unit into a direction of the field lens;

wherein the first lens surface has a shape that reflects a portion of the illumination light beam into a path that avoids the projection lens unit when the portion of the illumination light beam is reflected; and wherein the field lens has a shape that is convex toward the display device;

wherein the field lens is a biconvex lens and an absolute value of a radius of curvature of the first lens surface is greater than a radius of curvature of the second lens surface.

4. The projector of claim 3, wherein the field lens satisfies the following condition:

$$|R1| \geq 10*|R2|$$

wherein R1 is the radius of curvature of the first lens surface and R2 is the radius of curvature of the second lens surface.

5. The projector of claim 3, wherein the field lens satisfies the following condition:

$$|R1| \geq 200 \text{ mm}$$

wherein R1 is the radius of curvature of the first lens surface.

6. The projector of claim 1, wherein at least one surface of the field lens is a spherical surface.

7. The projector of claim 1, wherein an anti-reflection coating is provided on the first lens surface of the field lens.

8. The projector of claim 1, wherein an optical axis of the projection lens unit and a central axis of the display device are in parallel and are spaced by a predetermined distance.

9. The projector of claim 1, wherein one or more lenses included in the projection lens unit move along an optical axis to focus the illumination light beam with respect to a position of the screen.

10. The projector of claim 1, wherein the illumination lens unit comprises:

a collimating lens that collimates the light beam from the light source into a substantially parallel light beam;

a fly eye lens that substantially equalizes a color and brightness of the illumination light beam; and a relay lens that focuses the illumination light beam onto the display device.

11. The projector of claim 10, wherein the light source comprises a first light source and a second light source, and colors of light beams emitted from the first and second light sources are different from each other.

12. The projector of claim 11, wherein the first and second light sources are arranged to emit light beams along their respective optical axes that intersect with each other; and the projector further comprising a filter that controls optical paths of the light beams from the first and second light sources so as to make the light beams from the first and second light sources travel along an identical optical axis.

13. The projector of claim 1, wherein the projection lens unit comprises four lenses having negative, positive, negative and positive refractive powers, respectively, arranged in this order from the screen.

14. The projector of claim 1, wherein the projection lens unit comprises three lenses having positive, negative and positive refractive powers, respectively, arranged in this order from the screen.

* * * * *